(12) United States Patent
Vandersall et al.

(10) Patent No.: US 6,322,726 B1
(45) Date of Patent: Nov. 27, 2001

(54) FIRE RETARDANT CONCENTRATES AND METHODS FOR PREPARATION THEREOF AND USE

(75) Inventors: Howard L. Vandersall, Upland; Gary H. Kegeler, Diamond Bar, both of CA (US)

(73) Assignee: Astaris, LLC, St. Louis, MO (US)

( * ) Notice: Subject to any disclaimer, the term of this patent is extended or adjusted under 35 U.S.C. 154(b) by 0 days.

(21) Appl. No.: 09/256,226

(22) Filed: Feb. 24, 1999

Related U.S. Application Data

(60) Provisional application No. 60/076,328, filed on Feb. 27, 1998.

(51) Int. Cl.$^7$ .................................................. C09K 21/04
(52) U.S. Cl. ....................... 252/601; 252/602; 252/603; 252/2; 252/7
(58) Field of Search .................................. 252/603, 601, 252/602, 2, 7, 8

(56) References Cited

U.S. PATENT DOCUMENTS

| | | | | |
|---|---|---|---|---|
| 3,007,879 | * | 11/1961 | Jordan ..................................... | 516/77 |
| 3,196,108 | * | 7/1965 | Nelson ..................................... | 252/2 |
| 3,214,372 | * | 10/1965 | Lobos ..................................... | 252/2 |
| 3,245,904 | * | 4/1966 | Young ..................................... | 252/601 |
| 3,634,234 | * | 1/1972 | Morgenthaler ........................... | 252/7 |
| 3,955,987 | * | 5/1976 | Schaar et al. ........................... | 106/15 |
| 4,194,979 | * | 3/1980 | Gottschall ............................... | 252/7 |
| 4,442,157 | * | 4/1984 | Marx et al. ............................. | 428/173 |
| 4,447,337 | | 5/1984 | Mohammad et al. ..................... | 252/7 |
| 4,448,841 | * | 5/1984 | Glass et al. ............................. | 428/270 |
| 4,459,213 | * | 7/1984 | Uchida et al. ........................... | 252/8.05 |
| 4,588,510 | * | 5/1986 | Salyer et al. ............................ | 252/5 |
| 4,606,831 | | 8/1996 | Kegeler et al. .......................... | 252/7 |
| 4,652,383 | * | 3/1987 | Tarpley, Jr. et al. ..................... | 252/8 |
| 4,717,509 | * | 1/1988 | Buttgens et al. ........................ | 252/609 |
| 4,822,524 | * | 4/1989 | Strickland ................................ | 252/603 |
| 4,839,065 | * | 6/1989 | Vandersall ............................... | 252/603 |
| 4,908,160 | * | 3/1990 | Thacker .................................. | 252/608 |
| 4,971,728 | * | 11/1990 | Vandersall ............................... | 252/603 |
| 4,978,460 | * | 12/1990 | Von Blucher et al. .................. | 252/2 |
| 4,983,326 | * | 1/1991 | Vandersall ............................... | 252/603 |
| 5,091,097 | * | 2/1992 | Pennartz .................................. | 252/7 |
| 5,801,116 | * | 9/1998 | Cottrell et al. .......................... | 502/404 |

FOREIGN PATENT DOCUMENTS

| | | |
|---|---|---|
| 3716304 | 11/1988 | (DE) . |
| 4343728 | 6/1995 | (DE) . |
| 277932 | 8/1988 | (EP) . |
| 2301122 | 11/1996 | (GB) . |

OTHER PUBLICATIONS

Database WPI, Section Ch, Week 8503, Derwent Publications Ltd., London, GB; Class A60, AN 85–015078, XP 002105267 & JP 59 210987 A (Hitachi Cable Ltd), Nov. 29, 1984.

Database WPI, Derwent Publications, DE 4343728 (Loenhert), Dec. 21, 1993.

* cited by examiner

*Primary Examiner*—Jill Warden
*Assistant Examiner*—LaToya I. Cross
(74) *Attorney, Agent, or Firm*—Thompson Coburn LLP; Gregory E. Upchurch; Paul A. Lesko

(57) ABSTRACT

This invention comprises a concentrate further comprising a salt(s), a rheological modifier(s), an effective amount of a stabilizing compound selected from the group consisting of aliphatic carboxylic acids optionally substituted with one or more hydroxyl groups, aliphatic polycarboxylic acids optionally substituted with one or more hydroxyl groups, aliphatic and alicyclic organic compounds having at least three hydroxyl groups, glycols, mixtures thereof and the like and water which is present in an amount at least sufficient to solubilize the stabilizing compound(s) up to an amount at which said thickening compound is activated. This composition, upon dilution, after aging has the viscosity development characteristic(s) of a freshly diluted concentrate. If desired, this concentrate further comprises performance additives and other components and is preferably formulated for use in preparing a fire retardant concentrate.

45 Claims, No Drawings

FIRE RETARDANT CONCENTRATES AND METHODS FOR PREPARATION THEREOF AND USE

This application claims the benefit of priority under 35 U.S.C. §119(e) of United States Provisional Application No. 60/076,328 filed Feb. 27, 1998.

This invention relates to chemical fire retardants and more particularly to concentrates adapted for dilution with water to produce long-term fire retardant solutions comprising such concentrates.

BACKGROUND OF THE INVENTION

Agencies responsible for managing wildland eco systems in which accidental or natural fire is a significant concern often use long-term fire retardants in order to assist in extinguishing and controlling such fires so as to sustain only a minimum of damage. Such retardants can be applied from ground engines or aerially from helicopters and fixed wing aircraft. Fire retardants formulated for this purpose usually contain an ammonium phosphate, ammonium sulfate or mixtures thereof as the active fire retardant component. Such retardant formulations often contain, also, polygalactomannan gums to improve aerial application characteristics and cling of the fire retardant solution to the fuels on which they are applied. In addition, such formulations may contain coloring agents, corrosion inhibitors, bactericides and/or other such functional components as desired under use conditions.

One form of retardant is provided as a dry powder concentrate which, after delivery to the using location or using depot, is mixed with water and stored in a tank or tanks ready for transfer to the delivery vehicle when an emergency need arises. When these dry powder retardant concentrates are mixed with water, the polygalactomannan gum(s) which they contain are readily activated as reflected by a change in the rheological properties of the resultant solution within two to ten minutes or so after initial contact during mixing or addition is made.

Another form of retardant is provided as an aqueous fluid concentrate wherein the polygalactomannan gum and other insoluble components are suspended in a concentrated solution of the fire retardant salt(s) and auxiliary components. When suspended in high ionic strength concentrated fluids of this type, the polygalactomannan gum(s) remains inactive with no significant change in rheological properties. The concentrated fluid retardant formulations are delivered to using locations and stored as the concentrate until a fire emergency occurs. The length of storage varies dependent on the situation, e.g., from within minutes of delivery during an active emergency to the next fire occurrence which may be a year or even more in the future. Activation of the polygalactomannan gum, which is suspended in the fluid concentrate formulation, is brought about when additional water is introduced to dilute the concentrate to prepare the use-level solution. The concentrated fluids are generally not diluted until such time as the emergency occurs and they are transferred directly, following dilution, to the delivery or application vehicle. Dilution water is frequently mixed with the concentrate in the plumbing system between the storage and loading areas As with the dry-powder concentrates, the polygalactomannan gum suspended in the concentrate is activated by the dilution water resulting in the desired change in rheological properties within, at most, thirty minutes of bringing the two together.

Fire retardant solution prepared from either type of concentrate may be delivered to and applied for the intended purpose within a few minutes of being loaded or, on the other hand, the fire emergency may have changed prior to use of the diluted solution and consequently, the delivery vehicle may remain loaded or the solution may be transferred to an independent holding tank until the next need. This may be, perhaps, as long as thirty days or more after concentrate dilution and loading.

Some illustrative prior fire retardant compositions are described in U.S. Pat. No. 4,839,065; 4,971,728; and 4,983,326 all of which are incorporated herein in their entirety by reference.

In view of above described storage and use conditions, it is desired that (1) the fire retardant concentrate rapidly achieve the desired rheological characteristics so that it will perform as expected almost immediately after mixing or dilution with water and (2) the resultant fire retardant solution maintain these desirable rheological properties until use even if that does not occur for some time.

U.S. Pat. No. 3,007,879 which issued to Wesley A. Jordan on Nov. 7, 1961, addresses the loss of viscosity during storage of high viscosity aqueous guar gum solutions and discloses methods said to be useful for preventing same. The instant invention, on the other hand, addresses the rate of initial viscosity development when guar gum containing concentrates and dilution water are brought together.

Achieving and maintaining the aforementioned desirable rheological properties in a dry powder concentrate type fire retardant is possible using current technology, i.e., the polygalactomannan gum(s) remain essentially unchanged during even long term storage in the dry powder. However, the rate of viscosity development of solutions prepared from concentrated fluid type retardants often varies dependent on the length and temperature of concentrate storage prior to dilution. The rate and extent of viscosity development is one measure of the desirable rheological characteristics of fire retardant solutions. In general, viscosity development becomes progressively slower with the length of storage and increasing storage temperature. This change can be of sufficient magnitude so as to render the solution less effective in its ability to free fall from the delivery vehicles to the fuel treatment area, for example, and to cling to and protect the threatened vegetation.

In view of the emergency nature of wildland fires which occur without notice, time is critical in delivering the fire retardant solution to the fire. In order to avoid delays, the fire retardant solution must develop the desired rheological properties rapidly when needed. Any delay in ability to be readily used for any reason could make such solutions less effective than desired. Thus the invention disclosed and claimed herein is a needed improvement in this area.

OBJECTS OF THE INVENTION

It is an object of this invention to provide a fluid type fire retardant concentrate whose critical rheological properties are not significantly affected by storage temperature and storage time.

It is another object of this invention to provide a fire retardant concentrate adapted to be diluted and useful for controlling, suppressing, and extinguishing fires which has rapid viscosity development characteristics even after storing at high temperatures for long periods.

It is yet another object to provide a fire retardant solution which exhibits sufficiently stable Theological properties to allow its use even when stored for significant periods after dilution.

These and other objects are met by the concentrates of this invention which are described in more detail hereinafter.

BRIEF SUMMARY OF THE INVENTION

This invention comprises a concentrate further comprising a salt(s), a Theological modifier(s), an effective amount of a stabilizing component selected from the group consisting of aliphatic carboxylic acids optionally substituted with one or more hydroxyl groups, aliphatic polycarboxylic acids optionally substituted with one or more hydroxyl groups, aliphatic and alicyclic organic compounds having at least three hydroxyl groups, glycols and mixtures thereof and the like and water present in at least an amount sufficient to solubilize any water soluble component(s) up to the amount at which said rheological modifier is activated or substantially activated. Preferably this composition, upon dilution after aging, has the initial viscosity development characteristics and other desirable rheological properties of a solution prepared by diluting a fresh, non-aged, fire retardant concentrate. If desired, this composition further comprises performance additives and other optional components. The concentrates of this invention are useful in preventing, controlling and extinguishing fires in wildland fuels.

DETAILED DESCRIPTION OF THE INVENTION

The desired concentrate preferably exhibits a viscosity of less than about 2000 centipoise and contains between about 0.75% and about 6% by weight of a rheological modifier and at least about 24% by weight of fire retardant, salts, e.g., particularly diammonium phosphate, diammonium sulfate, a blend of diammonium phosphate and diammonium sulfate, a blend of monoammonium phosphate and diammonium phosphate having a nitrogen to phosphorus ratio of at least 1.25, or a blend of monoammonium phosphate, diammonium sulfate and diammonium phosphate having a nitrogen to phosphorus ratio of at least 1.25.

A rheological modifier is a substance which provides benefits such as increased viscosity, elasticity and the like. One or more rheological modifiers may be employed if desired according to use conditions.

In relation to use(s) as disclosed in U.S. Pat. No. 4,839,065 ('065), the salt employed herein is a water soluble fire retardant salt such as those disclosed above in the '065 patent. Preferably one or more such water soluble salts may be employed.

Useful salts include, but are not limited to mixed salt containing formulations. A mixed salt formulation is typically one which contains a mixture consisting of monoammonium phosphate and/or diammonium phosphate and diammonium sulfate as the active fire retardant component and the like.

Illustrative nonlimiting rheological modifiers which may be employed herein include one or more thickening agent(s) disclosed in the '065 patent and in addition any rheological modifiers which, when used in a fire retardant composition of this invention, produces the beneficial viscosity development characteristics disclosed herein.

In practice, preferably, the respective stabilizing component(s) is added to the water of composition of the fire retardant conconcentrate following dissolution of the fire retardant salt(s) therein but may be added at any time prior to the addition of the Theological modifier.

The stabilizing compound useful herein is selected from the group consisting of aliphatic carboxylic acids optionally substituted with hydroxyl groups, aliphatic polycarboxylic acids optionally substituted with hydroxyl groups, aliphatic and alicyclic organic compounds having at least three hydroxyl groups, glycols, mixtures thereof and the like. The stabilizing component(s) is one which, when employed in a composition of this invention, has sufficient water solubility that the benefits of the use of this invention are realized. Combinations of stabilizing components may be employed if desired although this is not required.

In providing the benefits of this invention, the utilized stabilizing component or its salt(s), reaction product(s) or mixture of such components modify the behavior of the rheological modifier incorporated in the fire retardant conconcentrate so that the fire retardant conconcentrate essentially retains its initial viscosity development characteristics.

Illustrative nonlimiting aliphatic carboxylic acids useful herein include those acids optionally substituted with one or more hydroxyl groups such as acetic acid, gluconic acid, formic acid, propionic acid, butyric acid, mixtures thereof and the like. A preferred aliphatic carboxylic acid is gluconic acid.

Illustrative nonlimiting aliphatic polycarboxylic acids optionally substituted with one or more hydroxyl groups useful herein include citric acid, tartaric acid, fumaric acid, maleic acid, malic acid, succinic acid, glutaric acid, adipic acid, saccharic acid, mixtures thereof and the like.

Preferably an aliphatic polycarboxylic acid useful herein is selected from the group consisting of tartaric acid, malic acid, fumaric acid, mixtures thereof and the like.

Illustrative nonlimiting aliphatic and alicyclic organic compounds useful herein are those having at least three hydroxyl groups such as sorbitol, d-arabitol, d-mannitol, pentaerythritol, sucrose, glycerol, galactose, lactose, maltose, fructose, glucose, mixtures thereof and the like. Of these, sorbitol, d-mannitol and glycol are preferred aliphatic and alicyclic organic compounds having at least three hydroxyl groups are especially useful herein.

An illustrative nonlimiting preferred alicyclic water soluble compound useful herein is sucrose.

Typically the concentration of the stabilizing component or combination of stabilizing components in a concentrate of this invention ranges from about 0.01% to about 10% and preferably from about 0.1% to about 5%, although those of skill in the art will recognize that greater and lesser concentrations and amounts of stabilizing component may be employed in achieving the benefits of this invention. Those of skill in the art will also recognize that the benefits of the use of this invention may be greater when the concentration of the stabilizing component is greater as for example with citric acid and ethylene glycol. This will be apparent from a reading of this specification and the accompanying Tables 1–7.

A preferred concentrate of this invention is one wherein said fire retardant salt is a mixture of monoammonium phosphate, diammonium phosphate and diammonium sulfate, the rheological modifier is a polyhydroxylated guar gum and the stabilizing component is sorbitol.

Another preferred concentrate of this invention is one wherein said fire retardant salt is a mixture of monoammonium phosphate and diammonium phosphate, the Theological modifier is a polyhydroxylated guar gum and the stabilizing component is sorbitol or a mixture of sorbitol and citric acid.

Yet another preferred fire retardant concentrate of this invention is one wherein said fire retardant salt is a mixture of monoammonium phosphate and diammonium phosphate, the Theological modifier is a derivatized guar gum and the stabilizing component is tartaric acid.

Optional additives useful in a composition of this invention include but are not limited to those disclosed in U.S. Pat. No. 4,839,065; 4,971,728 and 4,983,326.

Preferably, water is present in a concentrate of this invention in an amount at least sufficient to solubilize the stabilizing compound(s) up to an amount at which said thickening compound is activated.

The fire retardant solution of this invention is prepared by admixing the fire retardant concentrate with an appropriate amount of water. The appropriate amount of water used in this mixture varies and is dependent on the fire retardant salt type and amount and the ratio of those other functional components contained in the concentrate formulation. The composition of the fire retardant solution is generally expressed in terms of the volume of water which is admixed with one volume of the concentrate. These compositions generally range from about three to about four volumes of water per volume of concentrate, i.e., 3:1 to 4:1, although those skilled in the art will recognize that greater and lesser ratios may be employed depending on the composition of the concentrate component and other factors which will become apparent from reading this specification. Preferably, the stabilizing component(s) are added to the concentrate prior to or simultaneous with the addition of a rheological modifier.

An effective amount of the composition of this invention comprises an effective amount of the salt, rheological modifier and stabilizing component to achieve the benefits of the use of this invention.

The resulting concentrate of this invention develops substantially the same desirable Theological properties, as illustrated by the rate and extent of viscosity development, both immediately after being prepared and after being stored at varying temperatures and for varying lengths of time. The term "substantially the same" as employed herein means that for purposes of the intended use herein that any differences between the viscosity development characteristic of an aged concentrate of this invention and a freshly diluted concentrate are minimal and not of significance to one of skill in the art in practicing this invention.

The following Examples are provided merely to better define and more specifically describe the teachings and embodiments of the present invention. These Examples are for illustrative purposes only, and it is recognized that minor changes and/or alterations might be made that are not immediately disclosed therein. It is to be understood that to the extent that any such changes do not materially alter the final product or its functionality, they are considered as falling within the spirit and scope of the invention as defined by the claims that follow.

EXAMPLES

To further illustrate this invention, a series of fire retardant concentrates, each containing a fire retardant salt(s) component was prepared. Stabilizing component(s) identified in the first column in Tables 1–7, were employed as illustrative of a stabilizing compound individually in each concentrate. These concentrates were effective in providing the benefits of the use of this invention.

The stabilizing compound was added to water following dissolution of the fire retardant component therein but prior to or about the same time or at the same time as the addition of a Theological modifier. This produced a desired concentrate of this invention.

Experimental Procedures

The water component of the concentrated fluid was placed in a high shear mixer and the other components added in the order listed below. In some instances the individual components were premixed and added as a single component. In that case the stabilizing compound was added to the composition just prior to the addition of the guar gum rheological modifier.

| | |
|---|---|
| Water | To 100.0 |
| Carboxymethyl guar gum suspending agent | 0.6 |
| Color pigment | 0.5 |
| Diammonium sulfate | 32.2 |
| 1:1 weight ratio of mono and diammonium phosphate | 11.4 |
| Tolyltriazole | 0.1 |
| Sodium molybdate | 0.1 |
| Tricalcium phosphate | 0.7 |
| Stabilizing compound | Varied as per Tables 1–7 |
| Hydroxypropyl guar gum | 2.6 |
| Dimercaptothiadiazole | 0.4 |
| Polyglycol antifoaming additive | 0.1 |

The stabilizing compound was added at a level of about 0.5% and/or about 1% by weight or more based on the total weight of the fire retardant concentrate.

In more detail, the proper amount of water is added to the mixing vessel and agitation is begun. A preweighed suspension agent, such as carboxymethyl guar, and a color pigment, when color is desired, is added to the water and agitation increased as viscosity of the solution develops. Agitation should be rapid enough to completely disperse the added reagents but not so rapid that a significant amount of air is entrapped in the solution. The actual agitation rate will vary with the type and geometry of the mixing chamber. Viscosity development (as measured with a Brookfield model RVT viscometer fitted with a No. 4 spindle and rotating at 60 rpm) is allowed to continue until a maximum is reached which will vary dependent on the amount of suspending agent included in the formulation. The maximum viscosity will generally be in the range of 500 to 3000 cps. The fire retardant salt(s) are then added to the relatively viscous water solution. The agitation rate is adjusted as necessary to obtain dispersion and dissolution without a significant amount of air entrapment or splashing from the vessel.

Other functional additives (corrosion inhibitors, flow conditioners, bactericides, antifoaming agents, etc.) can then be added individually or as a mixture which was prepared beforehand. The type and amount of these functional additives may be varied dependent on other compositional variables and the desired properties of the final product. While continuing agitation the gum thickener (Theological modifier) is added. The gum thickener may be a simple guar gum or a derivatized guar gum exemplified by hydroxypropyl guar gum. It is important that the gum thickener be added after essentially all other components have been added and dispersed or dissolved within the solution.

The mixture of fire retardant salts varied in composition as illustrated in Tables 1–7.

TABLE 1

THE RATE OF VISCOSITY DEVELOPMENT OF FRESHLY PREPARED AND DILUTED FLUID CONCENTRATE RETARDANT - (Dilution ratio of 3.6 volumes of water per volume of concentrate.)

| Stabilizing Compound | % in Concentrate | Viscosity (cps) after 70° F. storage for indicated time after dilution. | | | | | | |
|---|---|---|---|---|---|---|---|---|
| | | 10 min. | 30 min. | 60 min. | 1 day | 3–5 day | 7 days | 15 days | 30 days |
| None | 0.0 | 1381 | 1390 | 1375 | 1386 | — | 1378 | — | 1314 |
| Sorbitol | 0.5 | 1330 | 1337 | 1340 | 1350 | 1367 | 1353 | 1390 | 1323 |
| | 1.0 | 1280 | 1293 | 1300 | 1303 | 1303 | 1310 | 1307 | 1280 |
| Glycerol | 0.5 | 1427 | 1440 | 1463 | 1503 | 1507 | 1490 | 1543 | 1500 |
| | 1.0 | 1343 | 1340 | 1330 | 1393 | 1377 | 1397 | 1423 | 1347 |
| Pentaerythritol | 0.5 | 1380 | 1377 | 1383 | 1467 | 1420 | 1430 | 1447 | 1397 |
| | 1.0 | 1360 | 1367 | 1580 | 1443 | 1413 | 1403 | 1420 | 1417 |
| Sucrose | 1.0 | 1463 | 1490 | 1513 | 1550 | 1563 | 1580 | 1540 | 1507 |
| | 1.5 | 1503 | 1517 | 1530 | 1553 | 1567 | 1570 | 1530 | 1470 |
| Ethylene glycol | 0.5 | 1467 | 1493 | 1530 | 1540 | 1543 | 1537 | 1543 | 1513 |
| | 1.0 | 1413 | 1440 | 1457 | 1503 | 1513 | 1483 | 1473 | 1447 |
| | 2.0 | 1470 | 1470 | 1473 | 1457 | — | — | — | 1403 |
| | 5.0 | 1473 | 1470 | 1483 | 1400 | — | — | — | 1483 |
| d-arabitol | 0.5 | 1487 | 1500 | 1500 | 1533 | 1557 | 1550 | 1533 | 1497 |
| | 1.0 | 1497 | 1517 | 1533 | 1570 | 1597 | 1600 | 1573 | 1543 |
| d-mannitol | 0.5 | 1503 | 1550 | 1563 | 1630 | 1643 | 1603 | 1580 | 1543 |
| | 1.0 | 1460 | 1463 | 1470 | 1527 | 1537 | 1510 | 1497 | 1477 |
| Succinic acid | 1.0 | 1503 | 1507 | 1513 | 1593 | 1587 | 1570 | 1547 | 1500 |
| Malic acid | 1.0 | 1527 | 1520 | 1547 | 1603 | 1610 | 1580 | 1537 | 1490 |
| L-glutamic acid | 1.0 | 1527 | 1503 | 1497 | 1553 | 1547 | 1540 | 1510 | 1493 |
| Fumaric acid | 1.0 | 1373 | 1390 | 1413 | 1390 | 1403 | 1400 | 1383 | 1360 |
| Benzoic acid | 1.0 | 1497 | 1517 | 1540 | 1557 | 1550 | 1563 | 1550 | 1507 |
| Gluconic acid | 1.0 | 1547 | 1550 | 1537 | 1517 | 1543 | 1547 | 1513 | 1463 |

— indicates that data is not available.

TABLE 2

THE RATE OF VISCOSITY DEVELOPMENT OF FLUID CONCENTRATE RETARDANT AGED AT 90° F. FOR 30–34 DAYS PRIOR TO DILUTION. - (Dilution ratio of 3.6 volumes of water per volume of concentrate.)

| Stabilizing Compound | % in Concentrate | Viscosity (cps) after 70° F. storage for indicated time after dilution. | | | | | | |
|---|---|---|---|---|---|---|---|---|
| | | 10 min. | 30 min. | 60 min. | 1 day | 3–5 day | 7 days | 15 days | 30 days |
| None | 0.0 | 1083 | 1177 | 1223 | 1445 | — | 1523 | — | 1472 |
| Sorbitol | 0.5 | 1627 | 1723 | 1747 | 1760 | 1747 | 1697 | 1680 | 1600 |
| | 1.0 | 1590 | 1643 | 1660 | 1710 | 1770 | 1663 | 1630 | 1557 |
| Glycerol | 0.5 | 1443 | 1470 | 1503 | 1610 | 1607 | 1633 | 1610 | 1587 |
| | 1.0 | 1473 | 1580 | 1627 | 1680 | 1667 | 1673 | 1603 | 1567 |
| Pentaerythritol | 0.5 | 1303 | 1383 | 1477 | 1543 | 1590 | 1587 | 1550 | 1513 |
| | 1.0 | 1277 | 1407 | 1483 | 1593 | 1600 | 1600 | 1547 | 1493 |
| Sucrose | 1.0 | 1447 | 1593 | 1677 | 1670 | 1663 | 1800 | 1737 | 1707 |
| | 1.5 | 1390 | 1453 | 1547 | 1673 | 1673 | 1683 | 1640 | 1623 |
| Ethylene glycol | 0.5 | 1293 | 1453 | 1533 | 1630 | 1617 | 1623 | 1590 | 1573 |
| | 1.0 | 1333 | 1547 | 1530 | 1653 | 1660 | 1663 | 1657 | 1643 |
| | 2.0 | 1520 | 1697 | 1720 | 1710 | — | — | — | 1687 |
| | 5.0 | 1523 | 1633 | 1627 | 1753 | — | — | — | 1833 |
| d-arabitol | 0.5 | 1510 | 1667 | 1700 | 1710 | 1717 | 1700 | 1680 | 1667 |
| | 1.0 | 1620 | 1703 | 1770 | 1753 | 1757 | 1690 | 1673 | 1640 |
| d-mannitol | 0.5 | 1500 | 1633 | 1677 | 1713 | 1683 | 1640 | 1633 | 1617 |
| | 1.0 | 1637 | 1690 | 1720 | 1767 | 1730 | 1673 | 1660 | 1650 |
| Succinic acid | 1.0 | 1327 | 1460 | 1493 | 1753 | 1813 | 1813 | 1800 | 1667 |
| Malic acid | 1.0 | 1663 | 1717 | 1653 | 1727 | 1760 | 1803 | 1790 | 1560 |
| L-glutamic acid | 1.0 | 1297 | 1343 | 1483 | 1660 | 1707 | 1700 | 1693 | 1593 |
| Fumaric acid | 1.0 | 1303 | 1340 | 1403 | 1613 | 1593 | 1587 | 1587 | 1547 |
| Benzoic acid | 1.0 | 1220 | 1353 | 1447 | 1610 | 1680 | 1643 | 1613 | 1590 |
| Gluconic acid | 1.0 | 1593 | 1747 | 1783 | 1780 | 1793 | 1670 | 1593 | 1550 |

— indicates that data is not available.

TABLE 3

THE RATE OF VISCOSITY DEVELOPMENT OF FLUID CONCENTRATE
RETARDANT AGED AT 90° F. FOR 90–92 DAYS PRIOR TO
DILUTION. (Dilution ratio of 3.6 volumes of water per volume of concentrate.)

| Stabilizing Compound | % in Concentrate | Viscosity (cps) after 70° F. storage for indicated time after dilution. | | | | | | |
|---|---|---|---|---|---|---|---|---|
| | | 10 min. | 30 min. | 60 min. | 1 day | 3–5 day | 7 days | 15 days | 30 days |
| None | 0.0 | 533 | 619 | 708 | 1127 | — | 1384 | — | 1458 |
| Sorbitol | 0.5 | 1353 | 1453 | 1480 | 1530 | 1580 | 1500 | 1530 | 1530 |
| | 1.0 | 1617 | 1729 | 1687 | 1663 | 1770 | 1607 | 1640 | 1593 |
| Glycerol | 0.5 | 913 | 950 | 1027 | 1350 | 1437 | 1400 | 1383 | 1433 |
| | 1.0 | 867 | 1023 | 1357 | 1490 | 1450 | 1433 | 1423 | 1467 |
| Pentaerythritol | 0.5 | 660 | 770 | 907 | 1300 | 1453 | 1420 | 1403 | 1457 |
| | 1.0 | 533 | 670 | 767 | 1240 | 1367 | 1440 | 1437 | 1513 |
| Sucrose | 1.0 | 696 | 773 | 850 | 1200 | 1310 | 1420 | 1453 | 1390 |
| | 1.5 | 500 | 637 | 723 | 1143 | 1307 | 1407 | 1393 | 1363 |
| Ethylene glycol | 0.5 | 707 | 897 | 1000 | 1370 | 1400 | 1533 | 1580 | 1527 |
| | 1.0 | 790 | 937 | 1003 | 1390 | 1417 | 1550 | 1537 | 1493 |
| | 2.0 | 1290 | 1390 | 1527 | 1640 | — | — | — | 1777 |
| | 5.0 | 1317 | 1373 | 1470 | 1603 | — | — | — | 1783 |
| d-arabitol | 0.5 | 1187 | 1357 | 1583 | 1510 | 1553 | 1590 | 1577 | 1533 |
| | 1.0 | 1250 | 1337 | 1437 | 1557 | 1600 | 1557 | 1547 | 1530 |
| d-mannitol | 0.5 | 1143 | 1203 | 1267 | 1567 | 1580 | 1563 | 1573 | 1530 |
| | 1.0 | 1273 | 1390 | 1473 | 1523 | 1587 | 1620 | 1573 | — |
| Succinic acid | 1.0 | 647 | 747 | 833 | 1297 | 1403 | 1623 | 1577 | 1470 |
| Malic acid | 1.0 | 1100 | 1183 | 1247 | 1513 | 1550 | 1647 | 1637 | 1470 |
| L-glutamic acid | 1.0 | 543 | 600 | 800 | 1247 | 1457 | 1503 | 1497 | 1450 |
| Fumaric acid | 1.0 | 950 | 1113 | 1127 | 1410 | 1520 | 1603 | 1640 | 1437 |
| Benzoic acid | 1.0 | 570 | 680 | 777 | 1227 | 1423 | 1467 | 1483 | 1387 |
| Gluconic acid | 1.0 | 1520 | 1603 | 1633 | 1673 | 1620 | 1647 | 1587 | 1467 |

— indicates that data is not available.

TABLE 4

RATE OF VISCOSITY DEVELOPMENT OF FLUID CONCENTRATE
RETARDANT AGED AT 90° F. FOR 180–182 DAYS PRIOR TO
DILUTION. (Dilution ratio of 3.6 volumes of water per volume of concentrate.)

| Stabilizing Compound | % in Concentrate | Viscosity (cps) after 70° F. storage for indicated time after dilution. | | | | | | |
|---|---|---|---|---|---|---|---|---|
| | | 10 min. | 30 min. | 60 min. | 1 day | 3–5 day | 7 days | 15 days | 30 days |
| None | 0.0 | 256 | 315 | 396 | 701 | 891 | 1003 | 1071 | 1182 |
| Sorbitol | 0.5 | 1003 | 1120 | 1200 | 1410 | 1437 | 1413 | 1370 | 1373 |
| | 1.0 | 1457 | 1500 | 1570 | 1600 | 1607 | 1590 | 1497 | 1490 |
| Glycerol | 0.5 | 400 | 520 | 600 | 1020 | 1170 | 1207 | 1247 | 1250 |
| | 1.0 | 440 | 550 | 650 | 1037 | 1170 | 1213 | 1260 | 1150 |
| Pentaerythritol | 0.5 | 333 | 433 | 523 | 913 | 1073 | 1150 | 1223 | 1157 |
| | 1.0 | 270 | 370 | 440 | 800 | 983 | 1023 | 1180 | 1080 |
| Sucrose | 1.0 | 340 | 450 | 520 | 930 | 1107 | 1143 | 1150 | 1117 |
| | 1.5 | 320 | 410 | 510 | 930 | 1073 | 1143 | 1153 | 1103 |
| Ethylene glycol | 0.5 | 350 | 440 | 527 | 930 | 1107 | 1183 | 1183 | 1203 |
| | 1.0 | 390 | 500 | 580 | 983 | 1147 | 1273 | 1227 | 1157 |
| | 2.0 | 1090 | 1193 | 1307 | 1400 | — | — | — | 1577 |
| | 5.0 | 1093 | 1180 | 1223 | 1313 | — | — | — | 1780 |
| d-arabitol | 0.5 | 630 | 770 | 870 | 1207 | 1293 | 1360 | 1360 | 1430 |
| | 1.0 | 910 | 1060 | 1120 | 1370 | 1460 | 1503 | 1387 | 1290 |
| d-mannitol | 0.5 | 820 | 980 | 1030 | 1330 | 1380 | 1467 | 1453 | 1340 |
| | 1.0 | 1110 | 1250 | 1320 | 1463 | 1490 | 1513 | 1470 | 1293 |
| Succinic acid | 1.0 | 260 | 340 | 420 | 857 | 1013 | 1237 | 1203 | 1057 |
| Malic acid | 1.0 | 700 | 820 | 900 | 1230 | 1317 | 1453 | 1347 | 1183 |
| L-glutamic acid | 1.0 | 280 | 400 | 480 | 887 | 1017 | 1220 | 1133 | 910 |
| Fumaric acid | 1.0 | 870 | 980 | 1030 | 1167 | 1370 | 1470 | 1463 | 1280 |
| Benzoic acid | 1.0 | 270 | 350 | 420 | 700 | 1027 | 1053 | 1117 | 1393 |
| Gluconic acid | 1.0 | 1370 | 1490 | 1520 | 1553 | 1543 | 1460 | 1470 | 1250 |

— indicates that data is not available.

TABLE 5

RELATIVE EFFECTIVENESS OF STABILIZING COMPOUNDS
IN FLUID CONCENTRATE TYPE RETARDANTS.
(Dilution ratio: 3.6 volumes water per volume concentrate.)

| Stabilizing Compound | % in Concentrate | Concentrate Storage @ 90° C. | | | | % Retention of 10 min. Viscosity | | |
|---|---|---|---|---|---|---|---|---|
| | | Fresh | 30 days | 90 days | 180 days | 30 days | 90 days | 180 days |
| | | 10 minute Viscosity (cps) | | | | | | |
| None | 0.0 | 1381 | 1083 | 533 | 256 | 78 | 39 | 19 |
| Sorbitol | 0.5 | 1330 | 1627 | 1353 | 1003 | 122 | 102 | 75 |
| | 1.0 | 1280 | 1590 | 1617 | 1457 | 124 | 126 | 114 |
| Glycerol | 0.5 | 1427 | 1443 | 913 | 400 | 101 | 64 | 28 |
| | 1.0 | 1343 | 1473 | 867 | 440 | 110 | 65 | 33 |
| Pentaerythritol | 0.5 | 1380 | 1303 | 660 | 333 | 94 | 48 | 24 |
| | 1.0 | 1360 | 1277 | 533 | 270 | 94 | 39 | 20 |
| Sucrose | 0.5 | 1463 | 1447 | 696 | 340 | 99 | 48 | 23 |
| | 1.5 | 1503 | 1390 | 500 | 320 | 92 | 33 | 21 |
| Ethylene Glycol | 0.5 | 1467 | 1293 | 707 | 350 | 88 | 48 | 24 |
| | 1.0 | 1413 | 1333 | 790 | 390 | 94 | 56 | 28 |
| | 2.0 | 1470 | 1520 | 1290 | 1090 | 103 | 88 | 74 |
| | 5.0 | 1473 | 1523 | 1317 | 1093 | 103 | 89 | 74 |
| d-arabitol | 0.5 | 1487 | 1510 | 1187 | 630 | 102 | 80 | 42 |
| | 1.0 | 1497 | 1620 | 1250 | 910 | 108 | 84 | 61 |
| d-mannitol | 0.5 | 1503 | 1500 | 1143 | 820 | 100 | 76 | 55 |
| | 1.0 | 1460 | 1637 | 1273 | 1110 | 112 | 87 | 76 |
| Succinic Acid | 1.0 | 1503 | 1327 | 647 | 260 | 88 | 43 | 17 |
| Malic Acid | 1.0 | 1527 | 1663 | 1100 | 700 | 109 | 72 | 46 |
| L-Glutamic Acid | 1.0 | 1527 | 1297 | 543 | 280 | 85 | 36 | 18 |
| Fumaric Acid | 1.0 | 1373 | 1303 | 950 | 870 | 95 | 69 | 63 |
| Benzoic Acid | 1.0 | 1497 | 1220 | 570 | 270 | 81 | 38 | 18 |
| Gluconic Acid | 1.0 | 1547 | 1593 | 1520 | 1370 | 103 | 98 | 89 |

TABLE 6

THE IMPACT OF STABILIZING COMPOUNDS ON THE RATE OF
VISCOSITY DEVELOPMENT OF DILUTED FLUID CONCENTRATE
TYPE RETARDANTS.

| Stabilizing Compound | Initial Visc. (cps) | | 90° F. Conc. Storage Before Dilution (days) | | | | % of Original 30 min. Viscosity Retained for Indicated Time (days) | | | |
|---|---|---|---|---|---|---|---|---|---|---|
| | 10 min. | 30 min. | 30–32 | 60–61 | 90 | 182 | 30–32 | 60–61 | 90 | 182 |
| | | | Viscosity 30 min. After Dilution (cps)**(See Attachment) | | | | | | | |
| A. 45% Salt Containing Concentrates* (See Attachment) (Dilution ratio 4.0 volumes of water per volume of concentrate.) | | | | | | | | | | |
| none | 1770 | 1785 | 1370 | 1120 | 960 | 477 | 77 | 63 | 54 | 27 |
| 1.0% citric acid | 1710 | 1740 | 1710 | 1560 | 1520 | 1297 | 98 | 90 | 87 | 75 |
| B. 43.6% Salt Containing Concentrates (Dilution ratio 3.6 volumes of water per volume of concentrate.) | | | | | | | | | | |
| none | 1463 | 1487 | 1247 | 840 | 663 | | 84 | 56 | 45 | |
| 0.5% citric acid | 1410 | 1437 | 1310 | 830 | 610 | | 91 | 58 | 42 | |
| 0.5% NH4 citrate | 1360 | 1340 | 1250 | 800 | 617 | | 93 | 60 | 46 | |
| 0.25% tartaric acid | 1340 | 1333 | 1290 | 840 | 680 | | 97 | 63 | 51 | |
| 0.5% tartaric acid | 1340 | 1367 | 1397 | 983 | 730 | | 102 | 72 | 53 | |
| 0.75% tartaric acid | 1353 | 1370 | 1473 | 1147 | 873 | | 108 | 84 | 64 | |
| 1.0% tartaric acid | 1313 | 1327 | 1580 | 1370 | 1223 | | 119 | 103 | 92 | |
| 1.0% Na tartrate | 1340 | 1347 | 1467 | 1110 | 867 | | 109 | 82 | 64 | |
| 0.25% sorbitol | 1407 | 1397 | 1420 | 1280 | 1107 | | 102 | 92 | 79 | |
| 0.5% sorbitol | 1320 | 1330 | 1487 | 1513 | 1467 | | 112 | 114 | 110 | |
| 0.75% sorbitol | 1297 | 1303 | 1477 | 1493 | 1477 | | 113 | 115 | 113 | |
| 0.5% each sorbitol and citric acid | 1423 | 1440 | 1523 | 1677 | 1700 | | 106 | 116 | 118 | |

TABLE 6-continued

THE IMPACT OF STABILIZING COMPOUNDS ON THE RATE OF VISCOSITY DEVELOPMENT OF DILUTED FLUID CONCENTRATE TYPE RETARDANTS.

| Stabilizing Compound | Initial Visc. (cps) 10 min. | Initial Visc. (cps) 30 min. | 90° F. Conc. Storage Before Dilution (days) 30–32 | 60–61 | 90 | 182 Viscosity 30 min. After Dilution (cps)**(See Attachment) | % of Original 30 min. Viscosity Retained for Indicated Time (days) 30–32 | 60–61 | 90 | 182 |
|---|---|---|---|---|---|---|---|---|---|---|
| C. 40% Salt Containing Concentrates (Dilution ratio 3.1 volumes of water per volume of concentrate.) | | | | | | | | | | |
| none | 1610 | 1620 | 1440 | 1330 | 1190 | 643 | 89 | 82 | 73 | 40 |
| 0.4% citric acid | 1620 | 1625 | 1660 | | 1540 | 1040 | 102 | | 95 | 64 |
| 0.9% citric acid | 1690 | 1690 | 1680 | | 1660 | 1997 | 99 | | 98 | 118 |
| 0.9% citric acid | 1690 | 1710 | 1670 | 1760 | 1550 | 1513 | 98 | 103 | 91 | 88 |
| 1.0% citric acid | 1640 | 1645 | 1637 | 1540 | 1610 | 1598 | 100 | 94 | 98 | 97 |
| 1.8% citric acid | 1680 | 1685 | 1690 | | 1740 | 1750 | 100 | | 103 | 104 |
| 2.7% citric acid | 1710 | 1700 | 1640 | | 1710 | 1977 | 96 | | 101 | 116 |
| 0.5% NH4 citrate | 1690 | 1685 | 1530 | | 1470 | 1213 | 91 | | 87 | 72 |
| 1.0% NH4 citrate | 1640 | 1650 | 1610 | | 1600 | 1200 | 98 | | 97 | 73 |
| 2.1% NH4 citrate | 1640 | 1640 | 1680 | | 1680 | 1520 | 102 | | 102 | 93 |
| 0.9% acetic acid | 1660 | 1660 | 1530 | 1460 | 1310 | 863 | 92 | 88 | 79 | 52 |
| 0.9% oxalic acid | 1630 | 1690 | 1470 | 1380 | 1140 | 590 | 87 | 82 | 67 | 35 |
| 1.0% tartaric acid | 1590 | 1610 | 1680 | 1790 | 1680 | 1520 | 104 | 111 | 104 | 94 |
| 1.2% terphthalic aci | 1690 | 1690 | 1520 | 1410 | 1200 | 723 | 90 | 83 | 71 | 43 |
| 0.2% sorbitol | 1630 | 1650 | 1590 | 1530 | 1570 | 1047 | 96 | 93 | 95 | 63 |
| 0.1% glycerol | 1600 | 1630 | 1480 | 1400 | 1230 | 690 | 91 | 86 | 75 | 42 |

*% salt values refer to the percent of fire retardant salt in the concentrated fluid where 74% is diammonium sulfate and 26% is ammonium phosphate.
**During aging, the concentrate is stored in a closed container to prevent evaporation and contamination. In the studies described herein, an aging temperature of 90° F. was chosen since this temperature is considered the highest which would generally be encountered by the concentrated fluid during that period of storage prior to dilution and use. The impact of concentrate aging on the viscosity development of its diluted solution is determined by periodic dilution of the concentrate through an aging period as illustrated in Tables 5–7.

TABLE 7

EFFECTIVENESS OF SORBITOL AS A STABILIZING COMPOUND IN PHOSPHATE-BASED FLUID CONCENTRATE RETARDANTS

| Stabilizing Compound | Length of Concentrate Storage Before Dilution (days)* 10 minute Viscosity (cps) | | | | |
|---|---|---|---|---|---|
| | 0 | 33 | 95 | 128 | 180 |
| A. 72° F. CONCENTRATE STORAGE | | | | | |
| none | 1383 | 1280 | — | 1230 | 1190 |
| 1.0% sorbitol | 1553 | 1490 | 1583 | — | 1413 |
| B. 90° F. CONCENTRATE STORAGE | | | | | |
| none | 1383 | 1217 | — | 1023 | 993 |
| 1.0% sorbitol | 1553 | 1500 | 1620 | — | 1547 |

*Dilution involves admixing 4.0 volumes of water with 1.0 volume of the concentrated fluid retardant.

The amount of water employed in these concentrates was at least that amount sufficient to solubilize the water soluble components in the formulation up to that amount at which the thickening compound was activated as indicated by a perceptible increase in solution viscosity The concentrated fluid is diluted, aged and tested as follows. Aliquots are taken from the homogenized concentrate and mixed with water at a predetermined ratio dependent on the salt content of the solution and the desired level of fire retardant effectiveness of the resultant solution. The ratio of dilution water to concentrate generally ranges from about 3:1 to about 4:1 or so. The water and concentrate are mixed together with sufficient agitation to ensure the preparation of a homogeneous solution.

Immediately after preparation, the concentrate is mixed with water in the manner described above to prepare the diluted solution and viscosity development measured as a function of time thereafter. Viscosity of the diluted solution is measured using a Brookfield Model RVT viscometer fitted with either a No.2 or No. 4 spindle (dependent on the viscosity level of the solution) rotating at 60 rpm. Viscosity development is determined via periodic measurements from 10 minutes to 30 days following dilution as illustrated in Tables 1–4. During this 30 day storage period, the diluted solution is stored at 70° F.

The solution viscosity data was determined from about 10 minutes to about 24 hours after dilution of the un-aged concentrate and is considered herein in connection with this invention as the viscosity development characteristic(s) of a freshly diluted concentrate.

After removal of the dilution aliquot, the remainder of the concentrate was placed in a tightly sealed glass jar and maintained at about 90° F. during subsequent aging for 30, 90 and 180 days.

At each respective aging period, e.g., 30 days, 90 days, 180 days, an additional aliquot of the aged concentrate was diluted with water to prepare a diluted solution in the manner described above. The viscosity development of this solution was then measured as a function of time during storage at about 70° F as indicated in the Tables 1–7.

The viscosity development characteristics of diluted solution prepared from aged concentrate was compared to the viscosity development characteristics of diluted solution prepared from fresh concentrate. Effective stabilizing compounds, i.e., those which achieve the object of this invention, reduce the difference in viscosity development obtained when fresh and aged concentrate are diluted. A preferred stabilizing compound(s) is one which, upon use, results in the least difference in viscosity development characteristics over the longest aging period.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A concentrate consisting essentially of:
   a. a fire retardant salt(s) component,
   b. a rheological modifier(s),
   c. about 0.01% to 10% of a water soluble stabilizing compound selected from the group consisting of aliphatic carboxylic acids optionally substituted with one or more hydroxyl groups, aliphatic polycarboxylic acids optionally substituted with one or more hydroxyl groups, aliphatic and alicyclic organic compounds having at least three hydroxyl groups, glycols and mixtures thereof and
   d. water present in an amount at least sufficient to dissolve said water soluble stabilizing compound up to an amount at which said rheological modifier(s) is activated, wherein the water present is less than an amount which would produce a ready to use fire retardant, and
   wherein said composition upon dilution after aging has the viscosity development characteristic(s) of a freshly diluted concentrate.

2. The concentrate of claim 1, wherein said concentrate further comprises performance additives and other components.

3. The concentrate of claims 1 or 2, wherein said concentrate is formulated for use in preparing a fire retardant concentrate and is adapted to be diluted.

4. The concentrate of claim 2 wherein said stabilizing compound is an aliphatic carboxylic acid optionally substituted with one or more hydroxyl groups.

5. The concentrate of claim 4 wherein said aliphatic carboxylic acid optionally substituted with one or more hydroxyl groups is selected from the group consisting of acetic acid, gluconic acid, formic acid, propionic acid, butyric acid, and mixtures thereof.

6. The concentrate of claim 5 wherein said aliphatic carboxylic acid is gluconic acid.

7. The concentrate of claim 2 wherein said stabilizing compound is an aliphatic polycarboxylic acid optionally substituted with one or more hydroxyl groups.

8. The concentrate of claim 7 wherein said stabilizing compound is selected from the group consisting of citric acid, tartaric acid, fumaric acid, maleic acid, malic acid, succinic acid, glutaric acid, adipic acid, saccharic acid, and mixtures thereof.

9. The concentrate of claim 8 wherein said water soluble compound is selected from the group consisting of tartaric acid, malic acid, and fumaric and mixtures thereof.

10. The concentrate of claim 2 wherein said water soluble compound is selected from aliphatic and alicyclic organic compounds having at least three hydroxyl groups.

11. The concentrate of claim 10 wherein said water soluble compound is selected from aliphatic organic compounds having at least three hydroxyl groups.

12. The concentrate of claim 10 wherein said water soluble compound is selected from alicyclic organic compounds having at least three hydroxyl group.

13. The concentrate of claim 10 wherein said water soluble compound is selected from the group consisting of sorbitol, d-arabitol, d-mannitol, pentaerythritol, sucrose, glycerol, galactose, lactose, maltose, fructose, glucose, and mixtures thereof.

14. The concentrate of claim 13 wherein said water soluble compound selected from sorbitol, d-mannitol, glycerol and mixtures thereof.

15. The concentrate of claim 1 wherein said fire retardant salt is selected from the group consisting of diammonium phosphate, diammoniurn sulfate, a blend of diammonium phosphate and diammonium sulfate, a blend of monoammonium phosphate and diammonium phosphate having a nitrogen to phosphorus ratio of at least 1.25 and a blend of monoammonium phosphate, diammonium sulfate and diammonium phosphate having a nitrogen to phosphorus ratio of at least 1.25.

16. The concentrate of claim 15 wherein said fire retardant salt is selected from the group consisting of diammonium phosphate, diammonium sulfate, a blend of diammonium phosphate and diammonium sulfate and a blend of monoammonium phosphate and diammonium phosphate having a nitrogen to phosphorus ratio of at least 1.25.

17. The concentrate of claim 16 wherein said fire retardant salt is a mixture of monoammonium phosphate, diammonium phosphate and diammonium sulfate, the rheological modifier is hydroxypropyl guar gum and the stabilizing compound is sorbitol.

18. The concentrate of claim 16 wherein said fire retardant salt is a mixture of monoammonium phosphate, diammoniurn phosphate, and diammonium sulfate, the rheological modifier is a non-derivatized guar gum and the stabilizing compound is sorbitol.

19. The concentrate of claim 16 wherein said fire retardant salt is a mixture of monoammonium phosphate and diammonium phosphate, the rheological modifier is hydroxypropyl guar gum and the stabilizing compound is sorbitol.

20. The concentrate of claim 16 wherein said fire retardant salt is a mixture of monoammonium phosphate and diammonium phosphate, the rheological modifier is a non-derivatized guar gum and the stabilizing compound is sorbitol.

21. The concentrate of claim 16 wherein said fire retardant salt is a mixture of monoammonium phosphate, diammonium phosphate and diammonium sulfate, the rheological modifier is hydroxypropyl guar gum and the stabilizing compound is d-arabitol.

22. The concentrate of claim 16 wherein said fire retardant salt is a mixture of monoammonium phosphate, diammonium phosphate and diammonium sulfate, the rheological modifier is a non-derivatized guar gum and the stabilizing compound is d-arabitol.

23. The concentrate of claim 16 wherein said fire retardant salt is a mixture of monoammoniurn phosphate and diammonium phosphate, the rheological modifier is hydroxypropyl guar gum and the stabilizing compound is d-arabitol.

24. The concentrate of claim 16 wherein said fire retardant salt is a mixture of monoammonium phosphate and diammonium phosphate, the rheological modifier is non-derivatized guar gum and the stabilizing compound is d-arabitol.

25. The concentrate of claim 16 wherein said fire retardant salt is a mixture of monoammonium phosphate, diammonium phosphate and diammonium sulfate, the rheological modifier is hydroxypropyl guar gum and the stabilizing compound is d-mannitol.

26. The concentrate of claim 16 wherein said fire retardant salt is a mixture of monoammonium phosphate, diammonium phosphate and diammonium sulfate, the rheological modifier is a non-derivatized guar gum and the stabilizing compound is d-mannitol.

27. The concentrate of claim 16 wherein said fire retardant salt is a mixture of monoammonium phosphate and diammonium phosphate, the rheological modifier is hydroxypropyl guar gum and the stabilizing compound is d-mannitol.

28. The concentrate of claim 16 wherein said fire retardant salt is a mixture of monoammonium phosphate and diammonium phosphate, the rheological modifier is a non-derivatized hydroxyl guar gum and the stabilizing compound is d-mannitol.

29. A process for preparing a fire retardant concentrate, wherein said concentrate upon dilution after aging has the viscosity development characteristic(s) of a freshly diluted concentrate, said process consisting essentially of admixing:
   a. a fire retardant salt(s) component,
   b. a rheological modifier(s),
   c. an effective amount of a water soluble stabilizing compound selected from the group consisting of aliphatic carboxylic acids optionally substituted with one or more hydroxyl groups, aliphatic polycarboxylic acids optionally substituted with one or more hydroxyl groups, aliphatic and alicyclic organic compounds having at least three hydroxyl groups, glycols and mixtures thereof and
   d. water in an amount at least sufficient to dissolve the water soluble stabilizing compound up to an amount at which said rheological modifier is activated and less than an amount which would produce a ready to use fire retardant.

30. The process of claim 29, wherein said concentrate further comprises performance additives and other components.

31. The process of claim 30 wherein said stabilizing compound is an aliphatic carboxylic acid optionally substituted with one or more hydroxyl groups.

32. The process of claim 32 wherein said aliphatic carboxylic acid optionally substituted with one or more hydroxyl groups is selected from the group consisting of acetic acid, gluconic acid, formic acid, propionic acid, butyric acid, and mixtures thereof.

33. The process of claim 32 wherein said aliphatic carboxylic acid is gluconic acid.

34. The process of claim 30 wherein said stabilizing compound is an aliphatic polycarboxylic acid optionally substituted with one or more hydroxyl groups.

35. The process of claim 34 wherein said stabilizing compound is selected from the group consisting of citric acid, tartaric acid, fumaric acid, maleic acid, malic acid, succinic acid, glutaric acid, adipic acid, saccharic acid, and mixtures thereof.

36. The process of claim 35 wherein said water soluble compound is selected from the group consisting of tartaric acid, malic acid, and fumaric acid and mixtures thereof.

37. The process of claim 29 wherein said water soluble compound is selected from aliphatic and alicyclic organic compounds having at least three hydroxyl groups.

38. The process of claim 37 wherein said water soluble compound is selected from aliphatic organic compounds having at least three hydroxyl groups.

39. The process of claim 37 wherein said water soluble compound is selected from alicyclic organic compounds having at least three hydroxyl group.

40. The process of claim 37 wherein said water soluble compound is selected from the group consisting of sorbitol, d-arabitol, d-mannitol, pentaerythritol, sucrose, glycerol, galactose, lactose, maltose, fructose, glucose, and mixtures thereof.

41. The process of claim 40 wherein said water soluble compound selected from sorbitol, d-mannitol, glycerol and mixtures thereof.

42. A concentrate comprising:
   a. a fire retardant salt(s) component,
   b. a rheological modifier(s),
   c. about 0.01% to about 10% of a water soluble stabilizing compound selected from the group consisting gluconic acid, tartaric acid, malic acid, fumaric acid, sorbitol, d-arabitol, d-mannitol, and mixtures thereof and
   d. water present in an amount at least sufficient to dissolve said water soluble stabilizing compound up to an amount at which said rheological modifier(s) is activated, and
   wherein said composition upon dilution after aging has the viscosity development characteristic(s) of a freshly diluted concentrate.

43. A process for preparing a fire retardant concentrate, wherein said concentrate upon dilution after aging has the viscosity development characteristic(s) of a freshly diluted concentrate, said process comprising admixing:
   a. a fire retardant salt(s) component,
   b. a rheological modifier(s),
   c. an effective amount of a water soluble stabilizing compound selected from the group consisting of gluconic acid, an aliphatic polycarboxylic acid optionally substituted with one or more hydroxyl groups, sorbitol, d-mannitol, d-arabitol, and mixtures thereof and
   d. water in an amount at least sufficient to dissolve the water soluble stabilizing compound up to an amount at which said rheological modifier is activated.

44. The process of claim 43 wherein said stabilizing compound is selected from the group consisting of citric acid, tartaric acid, fumaric acid, maleic acid, malic acid, succinic acid, glutaric acid, adipic acid, saccharic acid, and mixtures thereof.

45. The process of claim 44 wherein said water soluble compound is selected from the group consisting of tartaric acid, malic acid, and fumaric acid and mixtures thereof.

* * * * *